(12) United States Patent
Serlachius et al.

(10) Patent No.: US 12,041,881 B2
(45) Date of Patent: Jul. 23, 2024

(54) PUSH AND PULL RAKE HAVING FLEXIBLY ATTACHED STIFF TINES

(71) Applicant: Innotank Oy, Helsinki (FI)

(72) Inventors: Fredrik Serlachius, Kauniainen (FI); Jukka Enäjärvi, Helsinki (FI)

(73) Assignee: Innotank Oy, Helsinki (FI)

( * ) Notice: Subject to any disclaimer, the term of this patent is extended or adjusted under 35 U.S.C. 154(b) by 369 days.

(21) Appl. No.: 16/610,268

(22) PCT Filed: May 2, 2018

(86) PCT No.: PCT/FI2018/000012
§ 371 (c)(1),
(2) Date: Nov. 1, 2019

(87) PCT Pub. No.: WO2018/202939
PCT Pub. Date: Nov. 8, 2018

(65) Prior Publication Data
US 2021/0105936 A1    Apr. 15, 2021

(30) Foreign Application Priority Data

May 2, 2017 (FI) ...................................... 20170067

(51) Int. Cl.
*A01D 7/06* (2006.01)
*A01D 7/08* (2006.01)

(52) U.S. Cl.
CPC ....... *A01D 7/06* (2013.01); *A01D 7/08* (2013.01)

(58) Field of Classification Search
CPC .................. A01D 7/00–7/10; A01D 80/02
See application file for complete search history.

(56) References Cited

U.S. PATENT DOCUMENTS

| 524,215   | A | * | 8/1894  | Quigley  | A01D 7/06 56/400.21 |
| 1,980,252 | A | * | 11/1934 | Bergmann | A01D 7/06 56/400.18 |
| 2,030,321 | A |   | 2/1936  | Rucklos  |                     |
| 2,234,865 | A | * | 3/1941  | Jenkins  | A01D 7/04 56/400.17 |
| 2,423,772 | A | * | 7/1947  | Haase    | A01D 7/06 56/400.21 |

(Continued)

FOREIGN PATENT DOCUMENTS

CN    2200281 Y    6/1995
CN  202276640 U    6/2012

(Continued)

OTHER PUBLICATIONS

International Search Report and Written Opinion of the International Search Authority issued in PCT/FI2018/000012, mailed Aug. 17, 2018; ISA/FI.

*Primary Examiner* — Thomas B Will
*Assistant Examiner* — Madeline I Runco
(74) *Attorney, Agent, or Firm* — Laine IP Oy

(57) ABSTRACT

The invention comprises a rake that functions in the same position both when pulled and pushed and its stiff tines (39) are flexibly (9) pivoted or fastened with a spring (9) onto the rake head (16) that consists of an axle (16) made of a tubular section that is open is one side and the tines (39) have double ends (17).

10 Claims, 13 Drawing Sheets

(56) References Cited

U.S. PATENT DOCUMENTS

| | | | | |
|---|---|---|---|---|
| 2,536,607 | A | * | 1/1951 | Jenkins .................... A01D 7/02 56/400.17 |
| 3,654,754 | A | * | 4/1972 | Scoggin, Jr. ............. A01D 7/00 15/160 |
| 3,999,244 | A | * | 12/1976 | Brickley ................. A47L 13/00 15/142 |
| 4,150,528 | A | | 4/1979 | Rendin |
| 4,244,168 | A | * | 1/1981 | Howard ................... A01D 7/06 15/207.2 |
| 4,791,780 | A | * | 12/1988 | Phillips .................... A01D 7/00 56/400.17 |
| 5,001,802 | A | * | 3/1991 | Humphrey ............... B25G 1/02 15/229.6 |
| 5,069,026 | A | * | 12/1991 | Johnson ................... A01D 7/10 56/400.17 |
| 5,142,855 | A | | 9/1992 | Guidarelli |
| 5,241,812 | A | * | 9/1993 | Crippen ................... A01D 7/06 56/400.05 |
| 5,511,370 | A | * | 4/1996 | Patel ....................... A01D 7/06 56/400.21 |
| 5,522,209 | A | | 6/1996 | Petruzzelli |
| D409,460 | S | * | 5/1999 | Robinson ......................... D8/13 |
| 6,131,381 | A | | 10/2000 | Milbury |
| 6,151,878 | A | * | 11/2000 | Kalavitis .................. A01D 7/10 56/400.12 |
| 6,640,531 | B1 | | 11/2003 | Riley, II et al. |
| 6,948,302 | B1 | * | 9/2005 | Kalloo ..................... A01D 7/00 56/400.04 |
| 7,029,198 | B1 | * | 4/2006 | Cotto ....................... A01D 7/06 56/400.01 |
| D554,958 | S | * | 11/2007 | Kelley ............................. D8/13 |
| 9,854,735 | B2 | * | 1/2018 | Stein ........................ A01D 7/06 |
| 10,524,412 | B1 | * | 1/2020 | Harvey ..................... A01B 1/02 |
| 11,076,526 | B2 | * | 8/2021 | Stein ........................ A01D 7/06 |
| 2003/0188523 | A1 | | 10/2003 | Geremia |
| 2004/0134178 | A1 | * | 7/2004 | Serlachius ............... A01D 7/00 56/400.01 |
| 2006/0196162 | A1 | | 9/2006 | Iaizzo et al. |
| 2006/0207237 | A1 | | 9/2006 | Iaizzo et al. |
| 2009/0229236 | A1 | | 9/2009 | Schumacher et al. |
| 2012/0102908 | A1 | * | 5/2012 | Gayewski ................ A01B 1/20 56/400.05 |
| 2013/0001966 | A1 | | 1/2013 | Bowden |
| 2013/0205740 | A1 | | 8/2013 | Jordan |
| 2014/0260172 | A1 | | 9/2014 | Bowden |

FOREIGN PATENT DOCUMENTS

| | | | | |
|---|---|---|---|---|
| DE | 202012008117 | U1 | 11/2012 | |
| FI | 16027 | A | 8/1934 | |
| FI | 79925 | B | * 12/1989 | ............. A01D 7/00 |
| FI | 111123 | B | 6/2003 | |
| GB | 427035 | A | 4/1935 | |
| JP | 2000316337 | A | 11/2000 | |
| WO | WO-2006094214 | A2 | 9/2006 | |

* cited by examiner

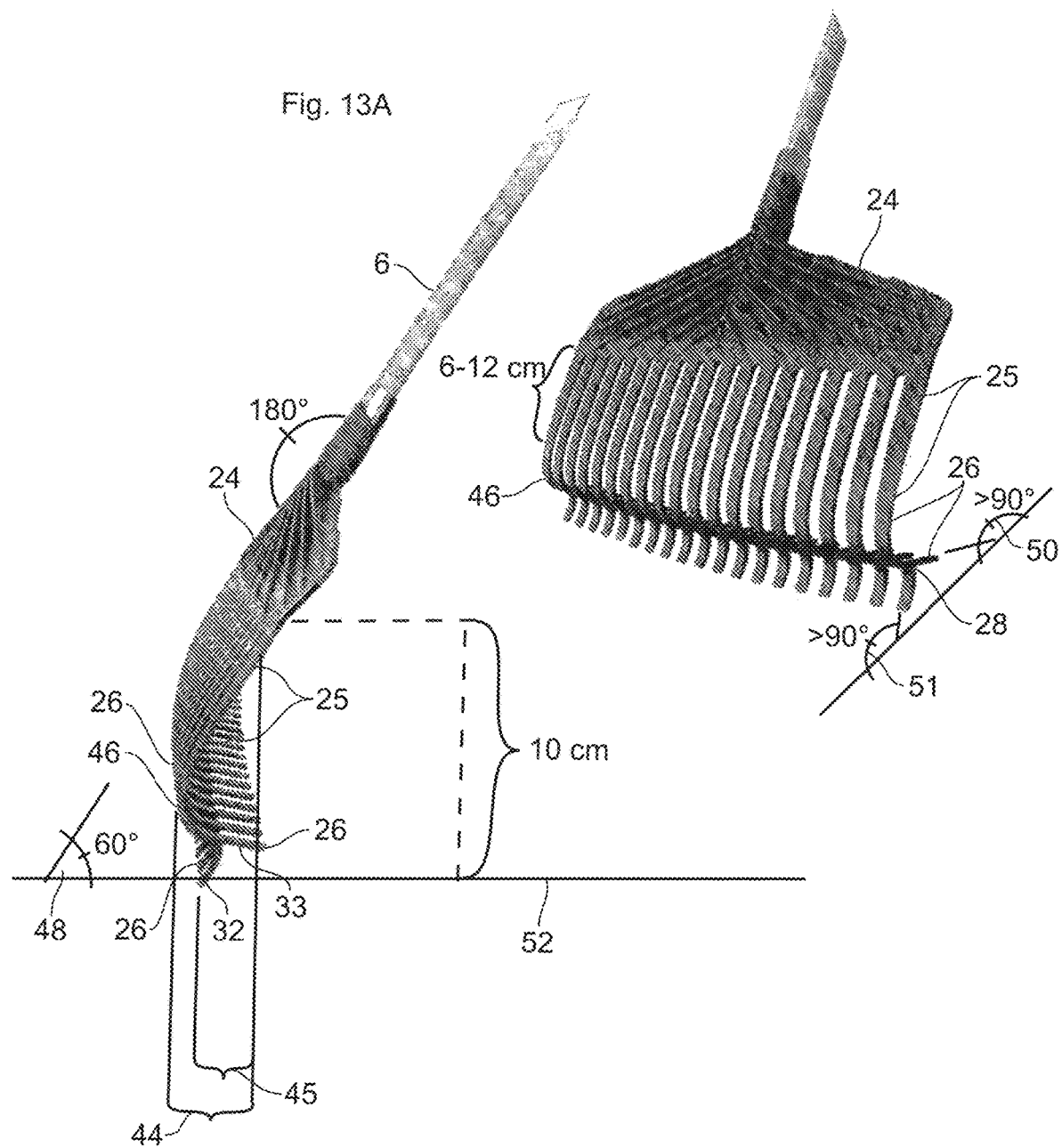

PUSH AND PULL RAKE HAVING FLEXIBLY ATTACHED STIFF TINES

CROSS REFERENCE TO RELATED APPLICATIONS

This application is a U.S. National Phase under 35 U.S.C. 371 of International Application No. PCT/FI2018/000012, filed May 2, 2018, and published as WO 2018/202939A1 on Nov. 8, 2018. This application is based on and claims priority to Finland Application No. 20170067 filed May 2, 2017. The entire disclosures of the above applications are incorporated herein by reference.

It is possible to rake with a rake according to the invention both with the pushing motion and pulling motion as the rake head stays in same position, and the stiff or somewhat stiff tines are flexibly pivoted or mounted with a spring onto the rake head.

The rake, an ancient invention, was born out the need to till and level out ground and to collect trash and other loose objects on the ground. The rake is known for its tines whose density and specifications are determined based on the purpose the rake is used for. A leaf rake is traditionally equipped with a dense and flexible row of tines, and a rake designed for moving heavier soil is equipped with more robust and stiffer tines.

In between those, there are different types of creations, but, as a general rule, the heavier the trash is the more robust and inflexible the rake and its tines are.

When choosing a rake, the density and height of the undergrowth are also decisive factors. The higher and thicker the undergrowth is, the longer the tines that are needed.

When determining the efficiency of a rake, the golden rule for that is based on the laws of physics. What is gained in the flexibility is lost in pulling the rake, in other words, it is hard to move a heavy load with a flexible rake. On the other hand, it is nice to work with a flexible rake, because the flexing also does its own work that is beneficial for raking. When pulled, a flexible rake tightens, and when the tension is released after pulling, it is easier to move the load.

But, the rule is also valid vice versa. The precondition for a good pull is to have stiff tines, at the expense of flexibility. A stiff rake is often used, for instance, for spreading soil or sand when the rake is in turn pulled and pushed.

Working with the so-called garden rake equipped with stiff tines is hard, because the act is 100% based on the use of man's strength as the garden rake entirely lacks the rake's flexibility that makes raking lighter and easier.

When raking with the so-called leaf rake, in practice, pushing is hardly ever used as the raking motion, which is strange, as the pushing motion has potential for very efficient use of strength, which would be of great benefit for raking. Man can generate even a lot of strength for the pulling motion used in traditional raking, but such raking style cannot be exploited when using a leaf rake, because all its tines are flexible and, for that reason, they do not hold the load in grip during a pulling motion. Hence, when raking with a leaf rake, such a technique is used in which the handle of the rake head that is in a relatively upward position is pushed against the ground, while the rake head is moved diagonally cross-directionally in front of man's body. The rake's own flexing attribute with relatively small and quick hand motions is exploited here, in which, when working, there is no room for a clean pulling motion. Now that we are talking about tools, their use promotes the development of the working positions and grips that are naturally most suitable for man's body.

Let us now think of the relatively heavy-structured outdoor stair broom that everybody knows, in which a dense broom with plastic or nature's flexible bristles is fastened onto its rectangular head. The most efficient and natural way to use this broom is to use quick forward pushing motions whereupon, due to the power of the pushing motion, the broom's bristles flex and the tines' own trigger power slings the load forward. In fact, similar to the leaf rake, the broom is also used with side-to-side motions, but when there is a situation where a heavier load, e.g., sand, has to be moved, the pushing motion is automatically used. We can now ask why the pushing motion is not part of the raking world, although technology also knows solutions developed for the pushing purpose, but those solutions have not become popular in the market. Earlier technology presents some solutions where the rake is meant to be also used with the pushing motion.

As an example thereof, let us mention the US Patent #2013/0205740, in which the rake head is pivotingly fastened onto the rake handle, which allows the rake head to be turned to be used either for pushing or pulling. When changing the raking style, it is relatively difficult to turn the rake head's position, and the long flexible tines are not suited for pushing, because, depending on the tines' angle to the ground, they either bend too much or, when they are positioned too directly toward the ground, they get stuck on the ground and break the ground surface.

The U.S. Pat. No. 5,142,855 represents another known technique that is comprised of a two-head solution that requires the rake to be turned 180 degrees, when changing from the pushing motion to the pulling motion and vice versa. In this solution, when pushed, the flexible tines bend too easily toward the ground, thereby making the work with the pushing motion inefficient.

The US Patent #20130205740 represents a third solution, in which the rake head's handle near the head is L-shaped so that, when pushed, the tines would function the same way as when pulled in a traditional manner. But, when pushed, so much more power is directed at the rake head, with the result that the rake's entirely bending long tines bend too easily against the ground, letting go off the trash, because the tines' angle against the ground is too small. Hence, it is not possibly to exploit the pushing motion optimally with this solution.

The rake, the US Patent #20140260172, representing the next known technique, consists of a solution in which the rake's sturdiness and structure mainly represent the garden rake. The tines are made of very inflexible, at least 5 mm thick (0.2 gauge) torsion spring, and the purpose is that the tines do not flex based solely on the rake motion; instead, the purpose is to pull the rake along the ground so that the relatively heavy rake efficiently pulls with its sharp-angled tines loose trash with it. If, when pulled, the tines or a tine get/s stuck behind a fixed or firmly attached object, such as a stone or a root, a stiff tine flexes from its coil to the extent so that it will not get stuck on the object but bends over it. Thanks to the stiff torsion springs, when turned, the rake can also be used as a garden fork or also for pushing trash piles on an even ground. We are talking here about pushing in its true meaning, unlike the Finnish invention presented here, in which we are talking about raking with pushing motions, meaning the use of a flexible rake, mainly a leaf rake, in which raking is also based on exploiting the flexing strength for moving trash.

The purpose of the US patent rake is to collect bigger or longer trash with a horizontal pull, which is evidenced both by the thickness of the tines whose diameter is over the 5 mm (0.2 gauge) and by the distance between the tines, which is over the 2.5 inches (over 6 cm). Neither does the fastening of the tines, i.e., the torsion springs, onto the head with bolts allow the mounting of the tines onto the tube with a shorter distance from each other, because the bolt fastening requires that much space in the tube. The distance, over 6 cm, between tines is inefficient for, e.g., gathering most trees' leaves.

True, the patent's explanation mentions in passing that it is possible to use a torsion spring as a flexible part and specifies that a torsion spring flexes when the spring coil rotates around its axle. It can be stated that, when raking with the traditional pulling motion, a rake according to the US patent would in fact work with more flexible torsion springs, but raking with a pushing motion would be completely inefficient. When raking with the tines' own and frame-specific settings that are in line with the claims in the U.S. invention, the tines would bend under the frame, and the downward-curved tines intended pulling, when pushed, would slide over the trash or load that is being raked, which, hence, would be natural, because the rake is not designed for raking with pushing motions.

True, a torsion spring works extremely well as a rake tine, but, as such, it does not work in all raking types. Raking with a garden rake requires sturdy, maybe somewhat flexible tines, the aforementioned US Patent #20140260172 as an example thereof, but, for it to work, a leaf rake requires more flexible tines. The tines' own angles and their angle to the handle are also decisive factors. Not to even talk about the push rake according to the present Finnish invention, whose technique implemented with a torsion spring is not known and which requires completely own solutions for it to work. for it to work. And it is a fact that a torsion spring is excellently suited as a tine for a push and pull rake. Later on in this explanation, a more detailed description of the functioning of the push rake and what is required of the tines for them to function both when pulled and pushed will be presented. But, still referring to a known technique, it can be stated that the torsion springs in the US patent #20140260172 are far too thick for them to work as push rake tines. For the over 5 mm thick spring wire to be flexible enough, its spring coil should be formed of numerous turns, which, then, would create too big a distance between the tines. When raking at least 45 degrees to both directions, i.e., back and forth from the tines' neutral, i.e, resting position, for it to function, the spring's diameter has to be approximately 1.5-3 mm and the coil has to have approximately 3-5 turns to create the required flexing, i.e., the motion path, for the push rake's tines. The more turns there are in the coil, the more flexible the torsion spring becomes. But the number of the turns in the coil must not increase too much, because it makes the distance between the tines too big to be suitable for a leaf rake.

The existing U.S. Pat. No. 6,640,531 represents another known technique that also consists of tines made of the torsion springs whose diameter is similar to the thickness, i.e., circa 2 mm, of the tines according to the Finnish invention presented here, but the rake is not intended for raking with pushing motions for two reasons. One of the reasons is that the tine ends point toward the ground at a 90-degree angle with the result that when the tines bend backwards in a pushing motion, they slide over the trash without getting a grip of it. The other reason is that the torsion springs are placed on the rake head in the manner allowing the tines to bend from their coil only to one of the two directions generated by the pull. But, when raking with pushing motions, the tines are not able to bend backwards from their coil, because the tines lean against the rake head's edge which, consequently, prevents the tines from being pushed backwards which is the precondition for raking with pushing motions. However, to prevent the tines from bending backwards is a natural solution, because the said rake according to the invention is not designed for raking with pushing motions.

All the solutions intended for both pulling and pushing presenting a known technique require either that the rake head or handle is turned horizontally 180 degrees or that the rake head is turned upside down when changing from the pushing phase to the pulling phase which requires that the rake's structure is such that it consists of either two heads or two tine rows attached onto the opposite edges in the head. Such solutions are heavy and impractical constructions.

The invention presented here is a solution for this problem, characterized in that, when the rake head stays in the same position, it is possible to rake with it both with the pulling and pushing motions, and the stiff or somewhat stiff tines are flexibly pivoted or fastened with a spring on the rake head or on part of the tine stubs in the head, in which the flexibility of the flexible part must be such that the power generated on the tines by raking bends the tines at their flexible point at least 45 degrees to both directions, i.e., forwards and backwards from the tines' resting position and the rake tines are equipped with the tine ends designed both for pulling and pushing, and, when in the resting position, the tine ends create over 90-degree angles to the ground that open to own working direction, i.e., forwards and backwards, when the rake handle is in the working position, this is, at a 45-60 degree angle to the ground.

When pushing the rake, the power directed on it is greater than when pulling the rake, because man's body weight is behind the push, allowing the tines to bend easily under the rake head, thereby losing most of their push effect. But, on the other hand, if the tines are too stiff, they get easily stuck onto the ground making it difficult to rake.

A part of the solution for this problem is for the rake to have stiff tines, and there is a flexible part or a joint in the tine shaft, preferably at its root, and, when the rake is pushed forwards, this flexible part or joint does bend the stiff tines backwards, but when the tines anyhow remain straight all the way to the tine ends, in spite of the bending, they maintain their grip of the load.

For the stiff tines to work for pushing, another decisive factor has to do with the tine's flexing properties.

The flexing properties at the tines' flexible point or joint cannot be too soft or slack, but also not too stiff or hard. If the flexing is too soft, even with the smallest raking motion, the tines bend too far backwards under the rake head even over 90 degrees from their starting position, and, although stiff, the tines' pushing capacity diminishes when the angle to the ground becomes too small. But, too stiff flexing prevents the tines from bending, allowing the tines to get stuck onto the ground and making it impossible to rake with pushing motions. The flexing must be such that, in the beginning, it allows the tines to bend easily over the critical point where they get stuck, circa 11-19 degrees from the starting position, whereafter the flexing stiffness increases, thereby stopping the bending and the tines into an efficient release position at approximately 45 degrees behind the tines' starting position. There is yet a third factor that has to materialize in order for the raking to be possible with pushing motions. This is the tines' angle to the base when starting to rake.

For determining the tines' angle, the starting point is the handle's raking angle to the base to be raked. For finding the tines' right position against the ground, taking into consideration the different tallness of the persons raking and their raking styles, the angle between the rake handle and the base is approximately 45-60 degrees, and the angle between the tines and the handle is calculated from this starting point. The length of the tines can vary between circa 6-20 cm.

It is quite easy to design a functional pulling rake. It has only to be made sure that the tines' angle to the ground is not too cutting, in other words, the tines' pulling angle to the ground must be between ca. 100-120 degrees. A larger angle makes the rake bump which makes raking more difficult. With the right angle in traditional raking, there is no difficulty with the pulling motion, because the pulling motion is directed backwards and diagonally upwards, which motion does not make the tines get stuck onto the ground. But to attain a smooth pushing motion is much more problematic. During the pushing motion, the pulling tines that are at a 100-120 degree angle backwards slide along the ground and do not stick at all onto the base. When the tines are directed forwards to the same degree level, the tine ends get stuck onto the ground and bend the tines at their flexible point backwards under the rake head, at the same time pushing the tine ends downward directly to the ground making the tines get stuck onto the ground. The pulling motion did not create such a problem, but when the tine's bending point and tine end's contact point with the ground are too close to one another, this is, when the distance of those points at the horizontal level is too short, the result is that when the rake is being pushed, as the tines bend, the pushing motion is directed downwards under the rake head and the tine ends pierce into the ground, totally jamming the raking.

The solution for this consists of three parts. A larger distance must be created between the tine's bending point and the tine's contact point with the base. This can be created with a tine that is directed from the bending point circa 6-12 cm forwards at an approximately 150-180 angle to the rake handle, from which point the tine bends downwards either gradually or immediately with a long end part against the base. Together with the rake handle, this end tip forms an approximately 100-110 degree angle, which, when the rake handle is at an approximately 45-60 degree angle to the base, with the tine ends in a resting position, settles into an approximately 100-120 degree angles opening to one's own working direction. It is also preferable that, after the 6-12 cm beginning stretch, the tine gradually continues downwards, making the tine bend downwards after the beginning stretch about 120-135 degrees for approximately 2-6 cm, and after this, it curves yet another 120-135 degrees for approximately 4-5 cm downwards at the end tip. The necessary distance between the bending point and the contact point to the ground can be created with this straight 10-cm beginning part of the tine.

The tine's long beginning stem is not inclined to bending immediately under the rake head; instead, a big part of the pushing power is now directed forwards, pushing the tines efficiently forwards, not downwards.

The most important of the tine angles is the one against the ground that forms the basis for efficient raking. The tine's 180 degree angle to the rake handle is flexible and may vary well by 20 degrees.

The solution's second part is to create for the pull and push motions their own ends with the right angle degrees, and those angles to the ground in line with the direction of the motion are at approximately 100-120 degrees. The branching into two ends takes place at approximately 1 cm before the end tip, but the branching can also take place earlier, but this requires a steeper angle for the tine's last bending point before the ground for the tine's end tip to be closer to the tine's flexible point than to the point that is farthest off from the tine's flexing point.

The biggest obstacle for a successful pushing motion is that the tines get stuck onto the ground, which happens if the direction of the pushing motion is too sharply downwards, and the solution for this problem was that there is a sufficient distance between the tine's bending point and the tine end's contact point with the ground. In such a case, the pushing power is directed forwards and the direction of the tine's push end sharply downwards is prevented. But when the pushing motion pushes the tines forward, the tine ends try to pierce diagonally downwards, making the tine ends plough deep into the ground's surface, making smooth raking with pushing motions impossible. In other words, this problem has to be solved before a 100% functioning pulling and pushing rake is created.

The solution for the problem is to imitate pull raking during the pushing motion, in which, irrespective of the angles, the tines never get stuck, because, when pulled, the tine ends are not directed downwards but diagonally upwards and horizontally along the base. Consequently, such a solution must be created, in which a push raking motion pulls the tines behind it. Such a solution can be created with the tines whose ends are not the farthest off point from the tine's flexible point at the horizontal level; instead, the tines must have a point that is farther than the tine ends from the tines' flexible point or joint. When pushing the rake, this point pulls the tines behind it, this way imitating raking with pulling motions, and the tines do not get stuck onto the ground.

The pull and push ends are preferably placed in forward line after each other in the tine stem, but they also work when placed side by side. The tines have their motion sector allowing them a 45-degree motion space into both directions, whereafter the tines stop at the sector edge that is preferably padded so that the tines would not wear out in constant contact with the sector surface.

The tine's double end can be made as a separate replacement part attachable to the tine stem or, when the rake head and the tines are made of plastic, with them in the same mould. When the tines are made of steel spring or wire, the double end can be easily bent into the V shape, directly creating two tandem ends preferably bent into the form of a loop.

If the rake tines are made of torsion springs, instead of the two-end tines, the head can be equipped with two axles which both are equipped with their own line of tines, the one for the pull phase and the other one for the push phase. The rake can also consist of one axle where every other of the torsion springs threaded onto it is adjusted for pulling and every other for pushing.

Yet another alternative is an extremely functioning solution.

Separate stiff tines attachable onto the head between the rake handle and the head form a solution, in which a flexible joint is formed from a rubber band or loops, in which case each of the tines to be fastened onto the rake head has at least two moving connection points in the rake head, and one of them is a support point and the other one a flexing point, at which flexing point the tine is directly or indirectly fastened with rubber loops onto the rake head, and the flexible part is a separate rubber band. There are other holes in the tines' bottom or root part for threading the rubber band through, and, after each tine, the rubber band forms a loop that fastens onto the pins or hooks attached to the rake head's back part.

When we talk about separate tines, they have to have two connection points with the rake head, one in the rake's front part and the other one in the rake head's back part, onto which normally the tine's back end fastens with rubber loops. In order for a tine to fit in between the two connection points located in the head, the longitudinal width of the head must be at least the length of a tine.

The longitudinal length of rake head is based on the number of the tines, this is, the more tines, the wider the head. The lightest, simplest, and extremely functioning head consists of a frame where the frame's front and back edge form the tines' and the head's connection points. It is advisable to have the head's back edge so wide that it has room for the rubber loops' fastening points. In such a head construction with an opening in the middle, it is possible to have spacers connecting the head's front and back edge, and those spacers both strengthen the head and form their own compartments for the tines. To allow the tines' unobstructed back-and-forth vertical bending motion, the head must be of a frame shape. The spacers connecting the front and back edge do not obstruct the tines' bending motions.

The front edge area forms a support point for the tines, where the tine is in direct contact with the rake head. The tine is movably pivoted onto the rake head through this contact point, either rotatingly in which the axle forms the rake head's front edge, onto which the tines are threaded through the holes in their stems. The other edge of the holes can be open through which opening the tine can be threaded into the axle, or mounted, in which case threading the tines into the axle requires that the axle is detachable. Any hard material, e.g., metal, polymer, or plastic, is suited for the axle material. It is also possible that there is a rubber loop in the axle's place, in which case the support point between the tine and the rake head and the flexible fastening point have changed places. There is an axle in the head's back part, onto which the tine is threaded and the front part's rubber loop is threaded through the holes in the spacers which contact point forms a flexible joint. In order for the joint to work, especially good flexibility is required from the rubber loop, but this solution requires that there are two holes in the tine stems, and that the rubber loop is continuously suspended. Another solution is that, instead of an axle, there is an elevated front edge, and holes or openings side by side are opened on the edge and the tines are threaded through them. Instead of the holes, the tine stems are equipped with collar-like thickened point preventing the tines from pushing forward from the collar. When assembling the rake, the tines are pushed into their place through the holes on the front edge, and the size of the holes makes it possible for the tines to go through with the back end going through first. The tine stays in the hole supported by the collar and the protruded back end is free for being fastened onto the head.

In order for the suspension with the rubber loop to succeed, the tines and the rubber loop must also have horizontally enough space, i.e., between the support point and the fastening point on the head's back edge. In practice, this means that, to allow space for the rubber loop to attach onto the head's back part, the tine's end part has to end at approximately 4-10 cm before the head's back part.

If it is desired that the rubber loops are hidden, the rake head can be solid and curved under which there is space where the tines with their rubber loops can be hidden. However, the head's curviness must allow the tines to bend approximately 80 degrees to both directions under the curved head.

Another solution to be reckoned with, in which one long rubber band is not used, is to equip each tine with its own rubber loop, and the rubber loop can be either a fitted part of the tine or attachable to the tine's back with a screwable bushing or from a loop onto a hook or pin at the tine's back end. Tine-specific rubber loops have the advantage that when a rubber loop is replaced, instead of the whole rubber band, only the defective rubber loop can be replaced.

The assembly of the rake is also faster with detachable tines and they also require less space sideways in the head.

The tine profile can vary from straight to curved or to a turn, but when we talk about detachable tines attached in two points onto to a head open in the middle, for this part, the tine's profile is straight, but after the support point, the tine's end tip has to be directed at the right angle to the ground, this way making a turn downwards after the support point. Consequently, the fastening of the stiff tines with rubber loops this way onto the rake head enables a rake solution, in which it is possible to rake both with pulling and pushing motions which, regardless, requires that the tines are at the right angle to the ground.

The tine's double end can be made as a separate replacement part attachable onto the tine stem or, when the rake head and the tines are made of plastic, in the mould with them. If the tines are made of steel spring or wire, it is easy to bend the double ends into the V-shape, directly creating two tandem ends, preferably bent into a loop shape.

If the rake tines are made of torsion springs, instead of the double-end tines, it is possible to equip the head with two axles, and both of them are equipped with their own tine row, one for the pulling phase and the other one for the pushing phase. The rake can also consist of one axle, where every other of the torsion springs threaded into it is adjusted for pulling and every other for pushing.

Yet another alternative to be reckoned with is an adjustment mechanism for the angle between the handle and the head placed between the rake handle and head, with which, whenever the work phase is changed, the tines can be adjusted to the angle required for the work phase.

It can be stated that, under certain conditions, a torsion spring is well suited to function as a tine for a rake with both the pushing and pulling motions. The conditions are that the diameter of the torsion spring wire must be such that, when raking, it only bends at the coil which approximately every 3-5 turns creates the flexibility required for raking with pushing motions at an approximately 45-90 degree angle to both directions from its resting position. In practice, this means that the thickness of the torsion spring wire should be approximately 1.5-3 mm.

To function as a rake tine, in order to stay fastened during the torsion power on it, a torsion spring needs to be firmly fastened onto the head. The fastening must allow the coil to move or rotate to both directions, i.e., both forwards and backwards. An extremely dependable and simple way to fasten torsion springs on a rake head is by threading the spring from its coil or coils on a detachable axle fastened onto the rake head. This way, the spring, i.e., the tine, stays horizontally stable when it suspends vertically on the axle. In order for the spring to suspend when turned, its coil's other end must be firmly anchored either onto the axle or onto the counterpart behind the axle, from which the spring is also released as needed. If the spring is anchored onto the axle, for this purpose, the axle must have suitable slots or holes into which the other end of the spring is placed in suspension. The gap remaining between the axle and the rake head also functions well as the fastening point for the torsion spring's other end.

The rake head can be made both of metal and of plastic as it is possible to fasten onto both heads tines whose material differs from the material used for the rake head.

When torsion springs function as rake tines, it is preferable that the rake head is also at least for the most part made of metal, but a durable plastic also works. In the simplest form, the rake head consists of an axle and a rake handle fastened onto it which rake handle is fastened onto the axle, e.g., with a Y-formed piece, and the Y-formed piece's both upper ends are fastened onto the axle ends or into the holes opened in the head axle for the Y-formed piece, and there is a sleeve fastened onto the bottom end of the Y-formed piece, onto which the handle is fastened. Any hard material is suitable for the Y-formed piece, among which metal and plastic are most suitable. As the axle is supported or fastened only at two points in the Y-formed piece, is imperative for the axle to be thick or sturdy enough for it not to bend from the pressure caused by raking. Also the fact that the holes opened in the axle for the Y-shaped piece to get space in the axle which, when the axle is narrow, would weaken the axle too much, speaks for the favour of the thickness of the axle. When the head practically only consists of an axle, it is difficult to fasten the torsion springs' other ends onto it; hence, there must be an additional part behind the axle fastened either onto the axle ends or onto the Y-formed piece, into which the spring's other end is pushed or locked. The additional part can be firmly fastened onto the Y-shaped piece or, in relation to it, horizontally or vertically movable with hinges, with which movement the spring's other ends are both locked and released.

But there is another recommendable solution, in which it is possible to use a lighter and narrower axle. In this solution, the rake head consists of a head piece that is relatively flat, approximately 3-4 mm thick and approximately 10-30 mm wide, with the length determined by the number of the tines, where the head has at least 3 spacers equipped with holes for the axle at a 90-degree angle to the head, of which spacers the first and the last are located at the ends of the head onto which the axle can be fastened, e.g., with wide hand screws. The other ends of the torsion springs that are threaded onto the axle are locked into the holes opened in the head for them. The rake handle's fastening part or sleeve is fastened onto the opposite side of the head's spacers. To avoid the friction generated by the torsion springs moving side by side, there is preferably a washer or a bushing made of plastic or similar slippery material diminishing friction between the torsion spring coils that is also suited for attenuating the noise generated by friction.

There also exists an extremely functioning solution, in which the rake consists of only an axle and a sleeve attached onto it for fastening the handle. In order for it to be possible to fasten the torsion spring's free back ends also onto the axle, the axle must have an axial flat side corresponding to circa ⅓ of the thickness of the axle, against which the torsion spring's, i.e., the coil's posterior end tip is tightly bent so that the torsion spring locks onto the axle. A sleeve is fastened in the middle of the axle for mounting the handle. One half of the torsion springs are threaded onto the axle from the axle's left side and the other half from the axle's right side. The sleeve can also be fastened onto the end of a Y-shaped piece and the two other ends of the Y-shaped piece are fastened onto the axle ends.

The following is a solution, in which the torsion springs' coils are not on the axle's outer surface making it difficult to fasten the sleeve onto the axle's surface. The solution consists of an axle made of a plastic or metal tubular section that is longitudinally open, i.e., equipped with an opening that is at least narrower that the thickness of the tube. The torsion spring coil is not threaded on top of such an open tube; instead, the coil is pushed inside the tube, and the other end of the torsion spring functioning as a tine protrudes from the tube opening and the torsion spring coil's another end, not including the coil's end tip that has to stay inside the axle, forms a V- or U-shaped loop protruding from the opening that locks the coil in the axle. Compared to the solution in which the coils move on top of the axle, this solution has two clear advantages. The rake handle's fastening point can be placed directly on the axle, irrespective of the torsion spring coils, because they are inside the axle. Another good point is that the springs are hidden which, for the appearance's sake, makes sense, and the spring coils do not collect rubbish on them. The tube opening must be large enough to ensure an approximately 45-degree motion sector to both directions for the tines.

The US Patent #20140260172 representing a known technique also presents a solution, in which the torsion springs are fastened onto the axle with bolts penetrating the axle. The solution works for the purpose of the invention, this is, moving a heavy load by pulling a rake along the ground, in which the recommended distance between the tines is 6 cm or more when the corresponding distance between the tines must be 0.5-2 cm in a pushing rake according to the invention presented here where there is no room for a nut and bolt mounting.

A nut and bolt mounting requires that the torsion spring has a loop for the bolt to stay fastened, which loop is tightened with a bolt firmly against the axle surface. For this reason, the torsion spring's other end consists of two tines, but the recommended form of the said push rake is reverse, in other words, the end of the torsion spring functioning as a tine is twisted into a narrow loop and the torsion spring's other end consists of two adjacent coils that are fastened onto the axle as mentioned above.

An extremely functioning solution consists of an integrated solution, in which the torsion spring functioning as a tine, for durability preferably twisted into the U shape, is fastened only at the back end on the rake head during the head's injection moulding in the mould. An extremely functioning stable integrated entity is created this way, and, with this production method, by changing the tine size and stiffness, it is possible to quickly make with the same mould rakes meeting the demand ranging from stiff garden rakes all the way to extremely flexible leaf rakes.

This solution prefers a torsion spring consisting of two coils placed side by side and the spring thread connecting them is bent into the form of a narrow loop. This so-called double torsion spring is a sturdy solution that does not move sideways or put an extra torsion load on the plastic head.

Another functioning solution consists of a rake, in which the head's top part is made of stiff material and of a flexible bottom part made of rubber or polymer material fastened under it that functions as the tines' flexible joint, onto which bottom part stiff tines are firmly anchored either by mechanically gluing or in the mould when moulding the rubber part or in connection with injection moulding. In order to make a durable joint between the tines and the rubber part, it is preferable that the bottom end fastened on the tines' rubber part is of the T or U shape which shapes also prevent the tines from bending sideways in the rubber part. The tines bend partly at the connection point between the tine and the flexible rubber part, but the biggest bending motion takes place at the connection point between the rake's stiff head and the rubber part fastened onto it.

For the tines to bend independently, the profile of the rubber part's front edge should be notched, in other words, the exit points of the rubber part's tines are higher than the rubber part area between the tines, which higher points bend independently, this way enabling the tines to bend independently.

Above, there is a mention of a possibility to connect detachable ends onto the tine end, and, if the tine is of a U-shape, it offers numerous ways to fasten detachable quick-release heads onto it. If the tine is a torsion spring bent into the U shape, the tine's double end can also be created by bending two sequential, loop-formed ends from the U-shaped end. Another functioning double end is created by twisting the U-shaped tine end a ¼ turn around its stem creating a double end that resembles a salmon's tail. Two facts speak for a solution using detachable tines, one of which is that it is possible to change the rake's tine ends suitable for the base and the other one is that it prevents the wear and tear of the bare U-shaped end.

Especially the rake's torsion spring solution, but also the other technique according to the invention, is excellently suited as the basis for a suspended snow rake which, instead of tines, consists of a blade equipped with a solid straight and sharp front edge, in which a technique similar to the fastening of the rake tines is applied to fastening it onto the head. The same goes for another application that can be called the rake broom in which the rake tines' ends are equipped with a dense broom or the entire front edge of a winter rake's blade is entirely equipped with a dense broom part.

The following is a presentation of the rake with the references to the enclosed illustrations, in which FIG. 1 shows a rake head, onto which the tines equipped with the rubber loops are fastened.

Figure 1:
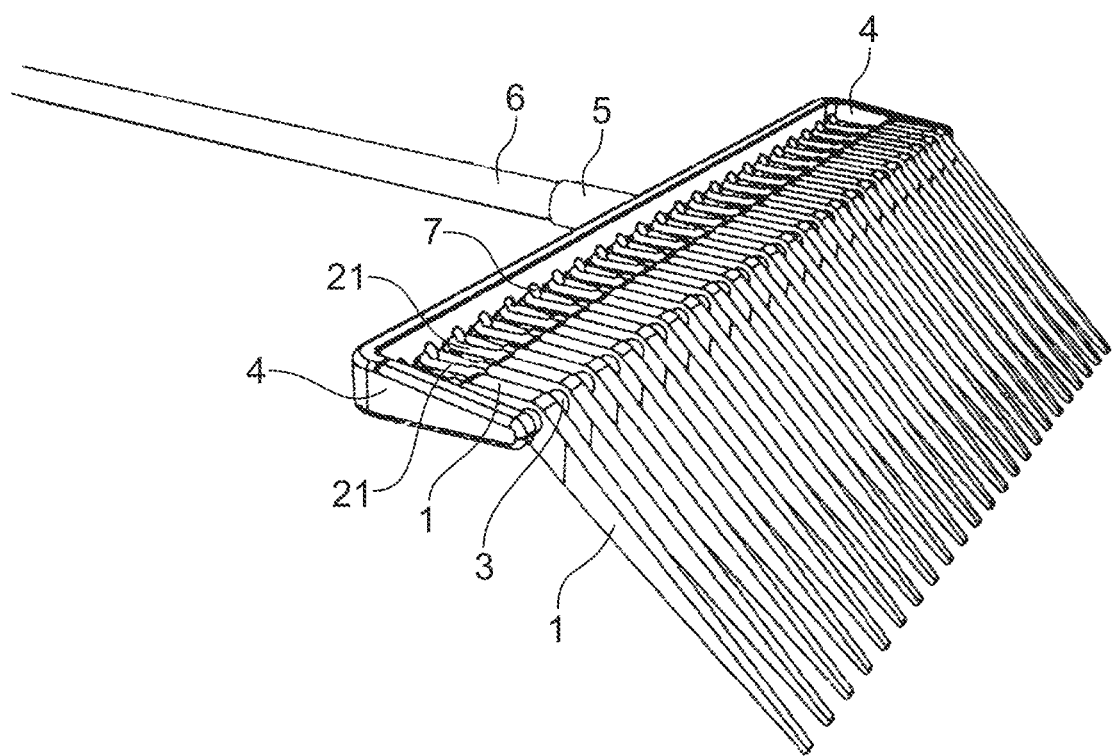

FIGS. 13A and 13B show an embodiment of a rake in accordance with the present invention having tines with double ends FIG. 1 presents a rake head (4), whose front part consists of an axle (3) that forms one of tines' (1) fastening points onto the head (4). The other fastening point consists of the hooks (7) at the back part of the head (4), onto which the rubber loops (21) attached onto the tines (1) are fastened. A sleeve (5) is fastened onto the head (4) for fastening the handle (6).

Figure 2:
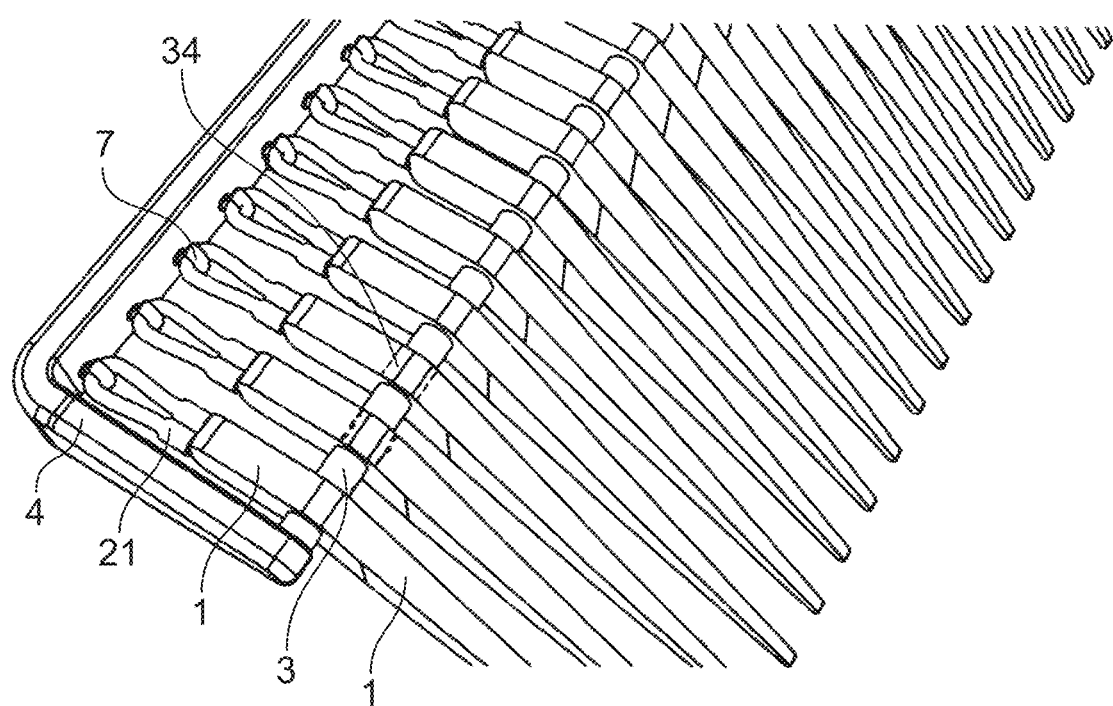
FIG. 2 shows a close illustration of the solution presented in FIG. 1.

FIG. 2 presents a close illustration of the fastening of the axle (3) going through the tine (1) holes (34) and the fastening of the rubber loops (21) attached onto the tines (1) onto the head's (4) hooks (7).

Figure 3:
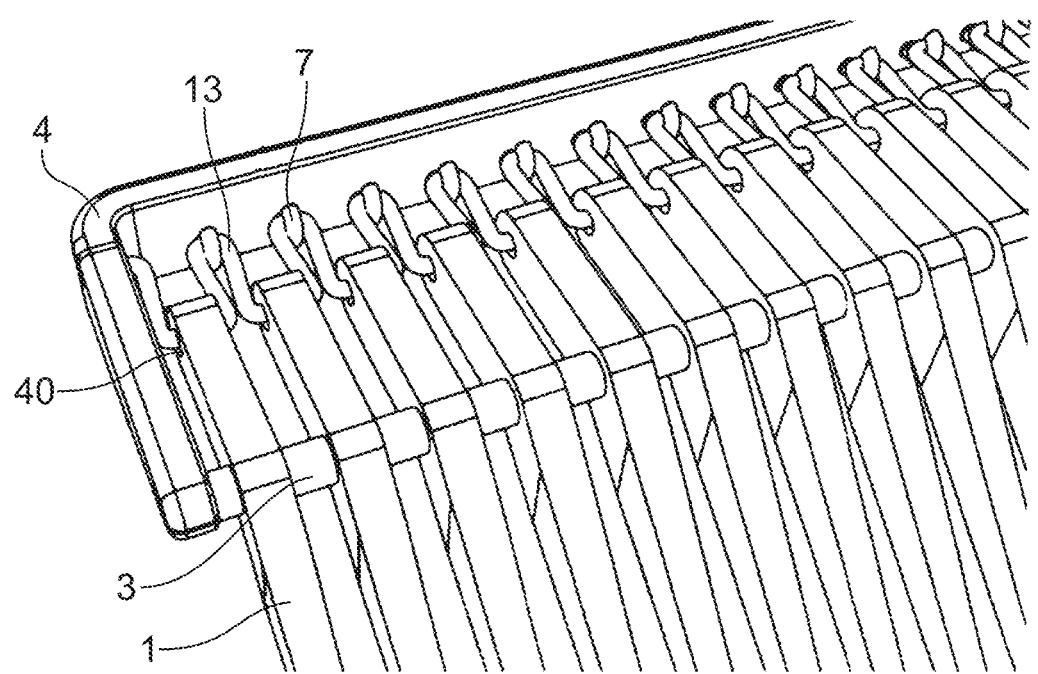
FIG. 3 shows a solution, in which the tines are attached onto the rake head with a separate rubber band.

FIG. 3 presents a close illustration of the fastening of the tines (1) onto the rake head (4) with a separate rubber band (13) that is threaded through the holes (40) at the back end of the tines (1), which rubber band (13) between the tines (1) forms a loop (13) that attaches onto the hooks (7) fastened onto the head (4).

Figure 4:
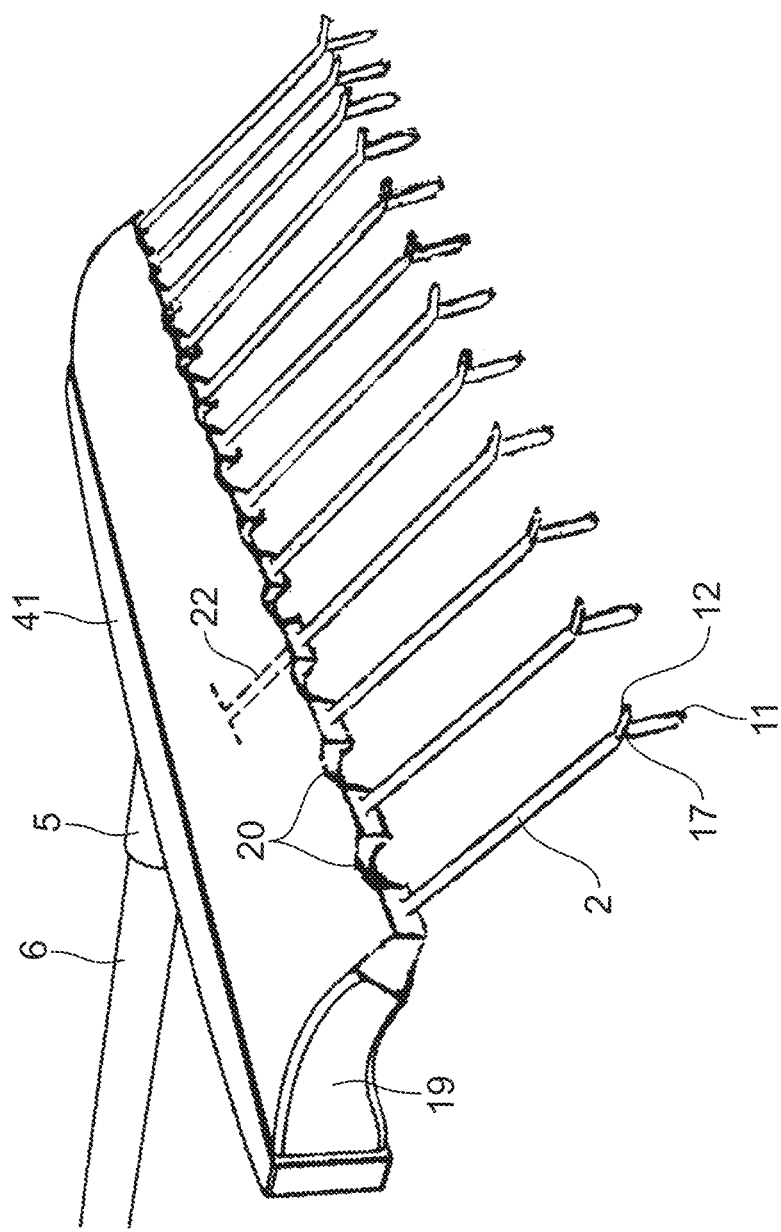
FIG. 4 shows a solution, in which the double-end tines made of metal spring are firmly anchored onto the flexible bottom part fastened onto the rake head.

FIG. 4 presents a torsion springs equipped with a double end (17) that function as the tines (2) anchored from their L-shaped (22) ends onto the notched (20) bottom part (19) made of the rake head's (41) flexible polymer material. The head has a sleeve (5) for the handle (6).

Figure 5:
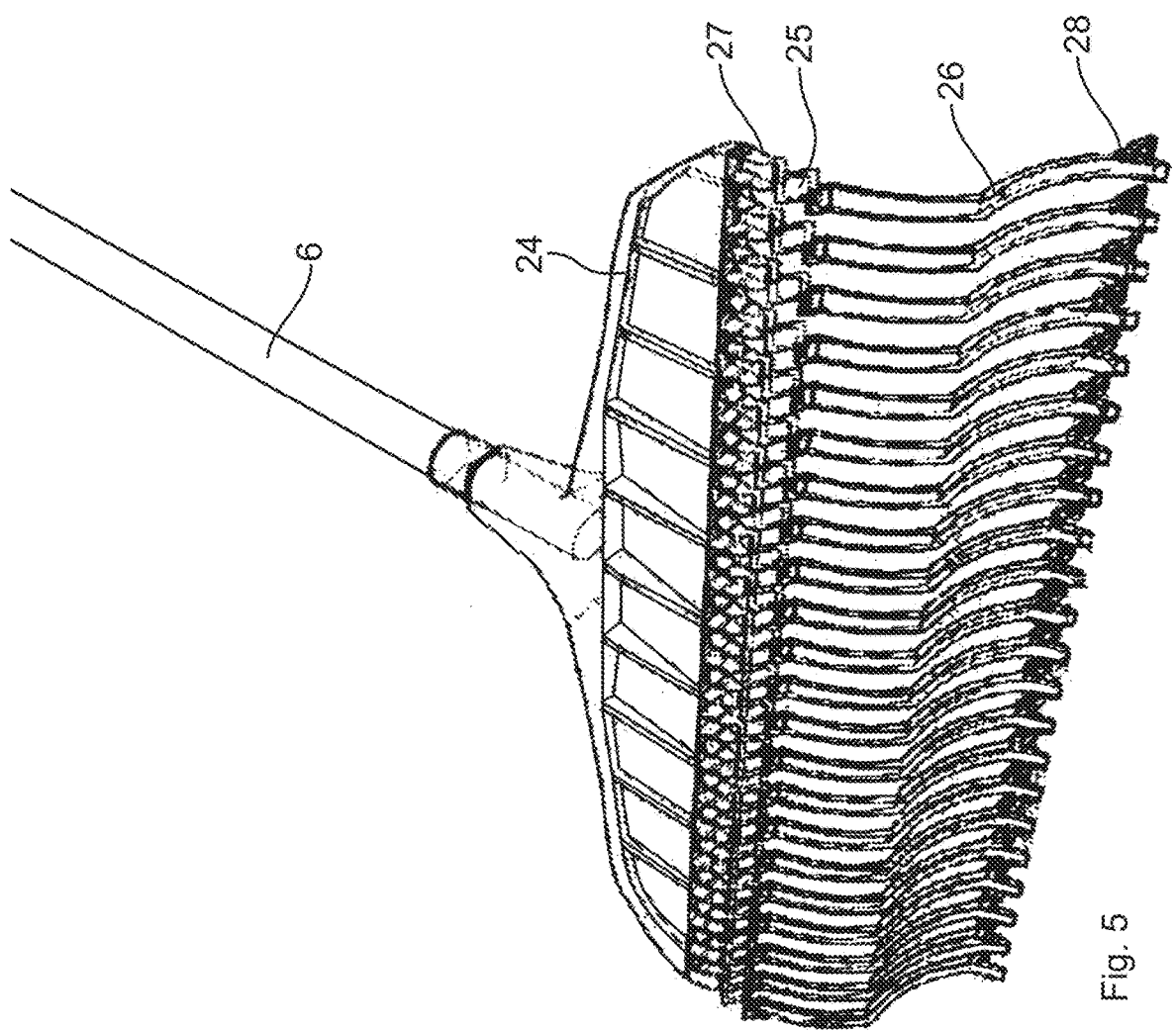
FIG. 5 shows an integrated solution, in which the rake is entirely made of the same polymer material.

FIG. 5 presents an integrated solution, in which the entire rake is made of the same flexible polymer material, and the rake head (24) with its tine stubs (27) and the tines (26) with their double ends (28) are made of a sturdy thicker material layer and the flexible part (25) is made of a thinner material layer.

Figure 6:
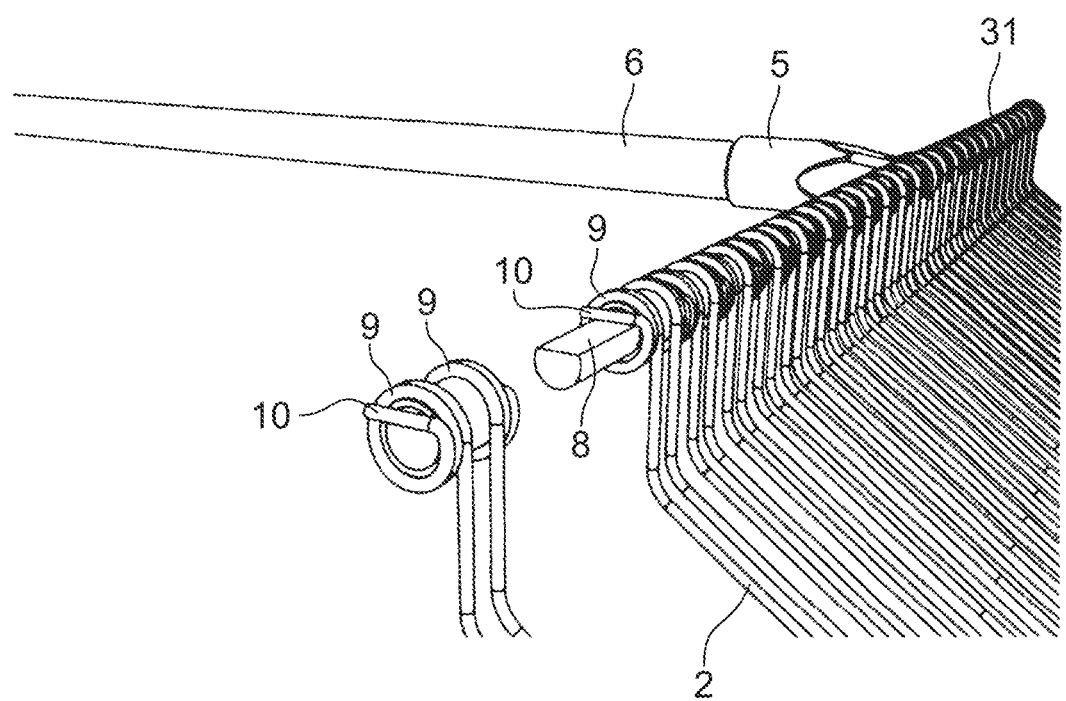
FIG. 6 shows a solution, in which the rake's torsion spring tines are threaded onto the axle equipped with a flat side.

FIG. 6 shows a flat-sided (8) axle functioning as the rake head (31), and the torsion springs functioning as the tines (2) are threaded onto it, and the coils' (9) free shorter end tips (10) are firmly bent against the axle's (31) flat edge (8).

Figure 7:
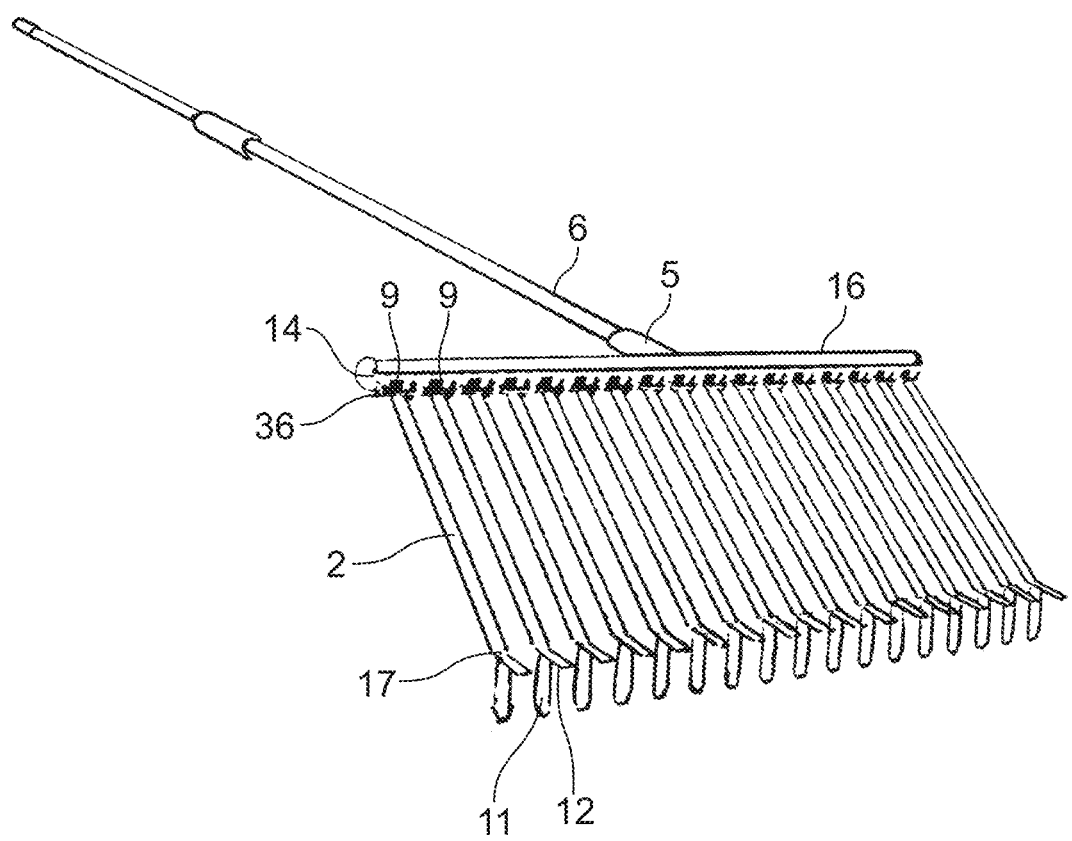
FIG. 7 shows a solution, in which the rake head consists of a tubular section open on one side and the torsion spring coils functioning as the tines are placed inside it, and the tine end consists of double ends.

FIG. 7 shows a tubular section (16) open on the side (36) functioning as the rake head, and the torsion springs (2) bent at the middle into the U shape with two coils (9) function as the rake tines (2), and a double end (17) is bent from their U-shaped end, and one of the double end's (12) end is directed forwards and diagonally up in relation to the tine (2) stem and the other one (11) forwards diagonally down.

Figure 8:
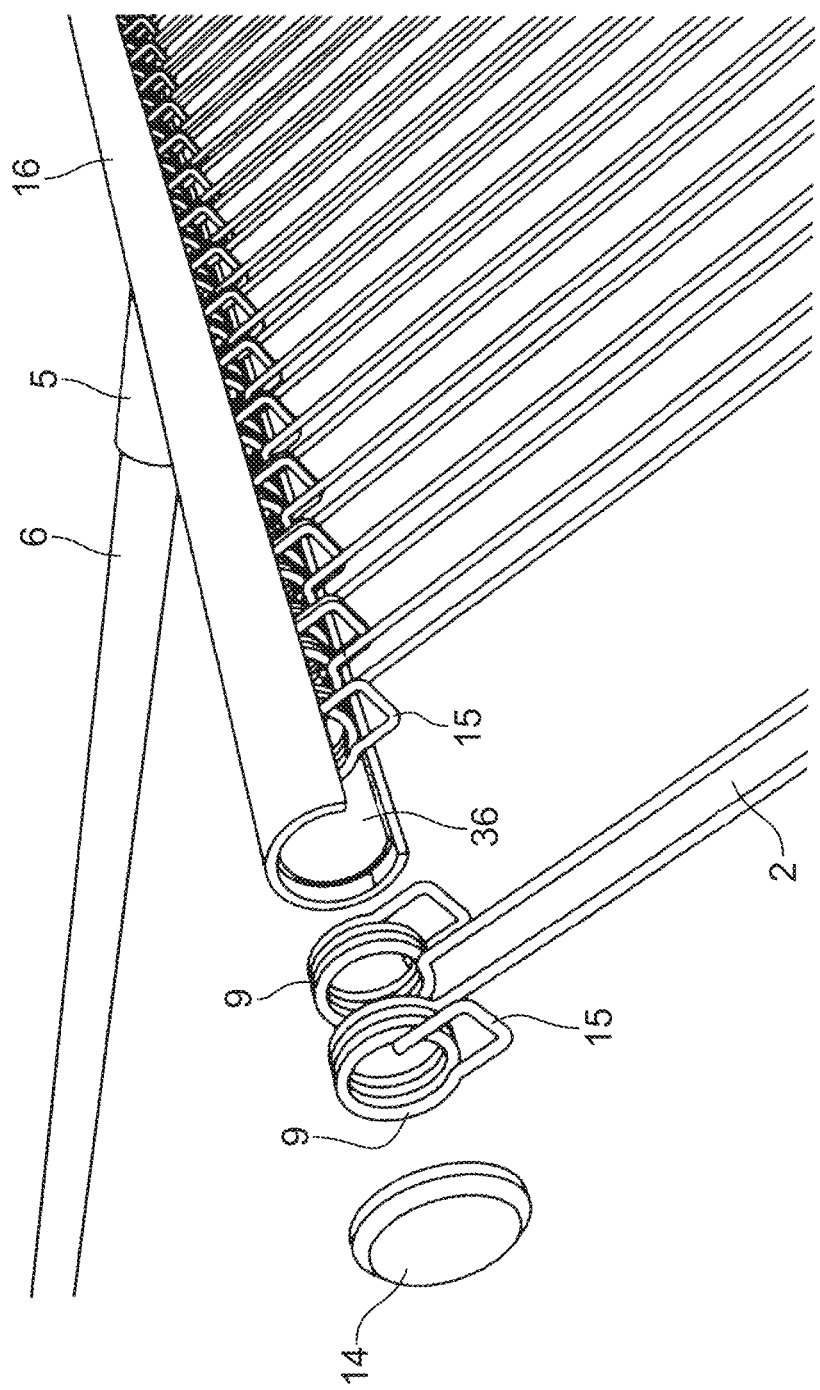
FIG. 8 shows a close illustration of the rake's open tubular section and of the U-shaped torsion spring functioning as a tine and of the U-shaped loop of the coil's end tip.

FIG. 8 shows a close illustration of a tubular section equipped with an open (36) side that functions as the rake head (16), and the torsion springs (2) with the coils (9) functioning as the tines (2) are placed inside it, and, thanks to the U-shaped loops (15) penetrating from the opening (36) at their end tips, the coils (9) stay in the tube (16) without rotating. There are plugs (14) at the tube (16) ends for preventing the coils (9) from coming out of the tube (16).

Figure 9:
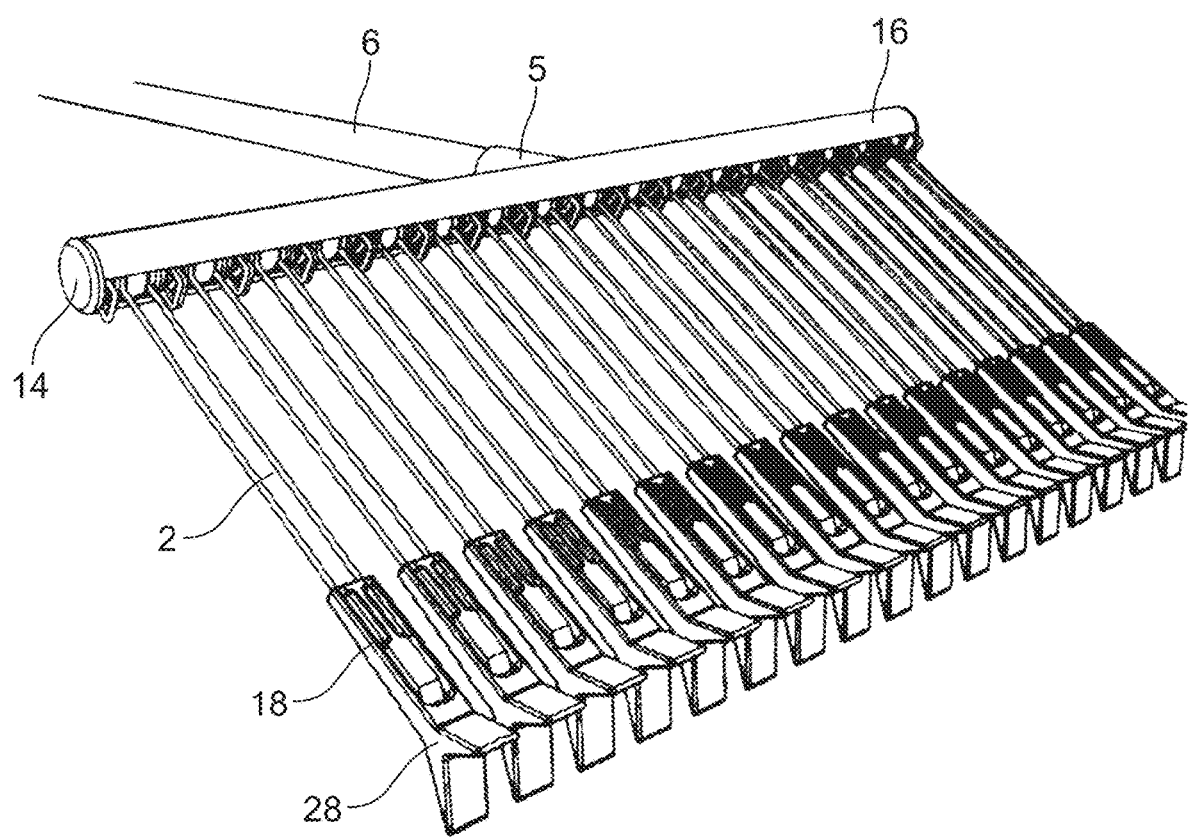
FIG. 9 shows a solution, in which a double end is fastened onto a U-shaped torsion spring's end with quick clamping.

FIG. 9 shows a rake with a tubular section head (16) equipped with the torsion spring tines (2) that are of the U-shape, whose U-shaped tines (2) are equipped with the double ends (28) that operate with quick clamping (18).

Figure 10:
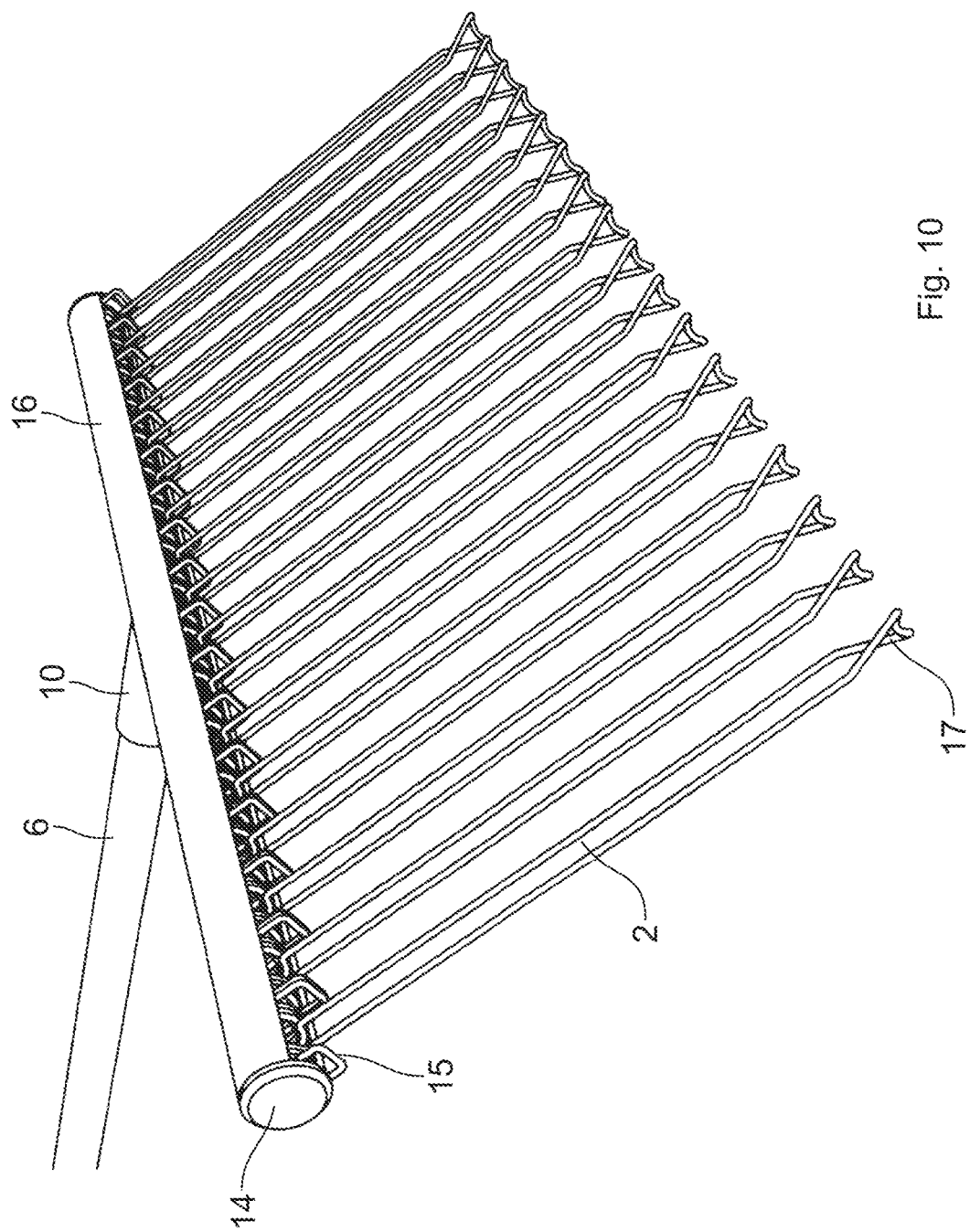
FIG. 10 shows a solution for the double end twisted in a U-shaped torsion spring.

FIG. 10 presents a rake with a tubular section head (16) and the ends of its U-shaped torsion spring ends functioning as the tines (2) are bent into a double end (17) resembling a salmon's tail.

Figure 11:
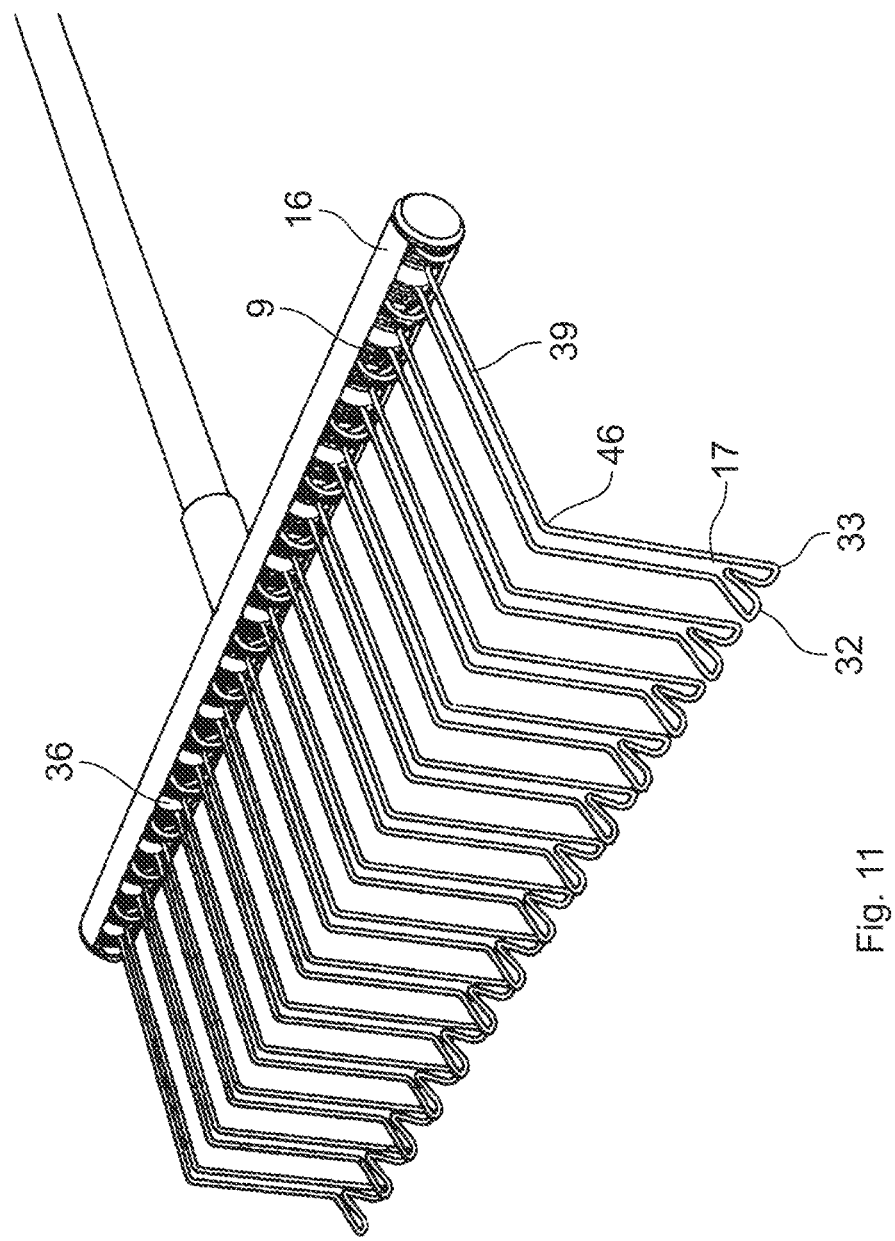
FIG. 11 shows a tine solution, in which the tines curve through a turn toward the ground.

FIG. 11 shows a solution, in which the tine (39) bends through a curve (46) towards the ground, and the tine's (39) end consists of two end tips (32, 33).

Figure 12:
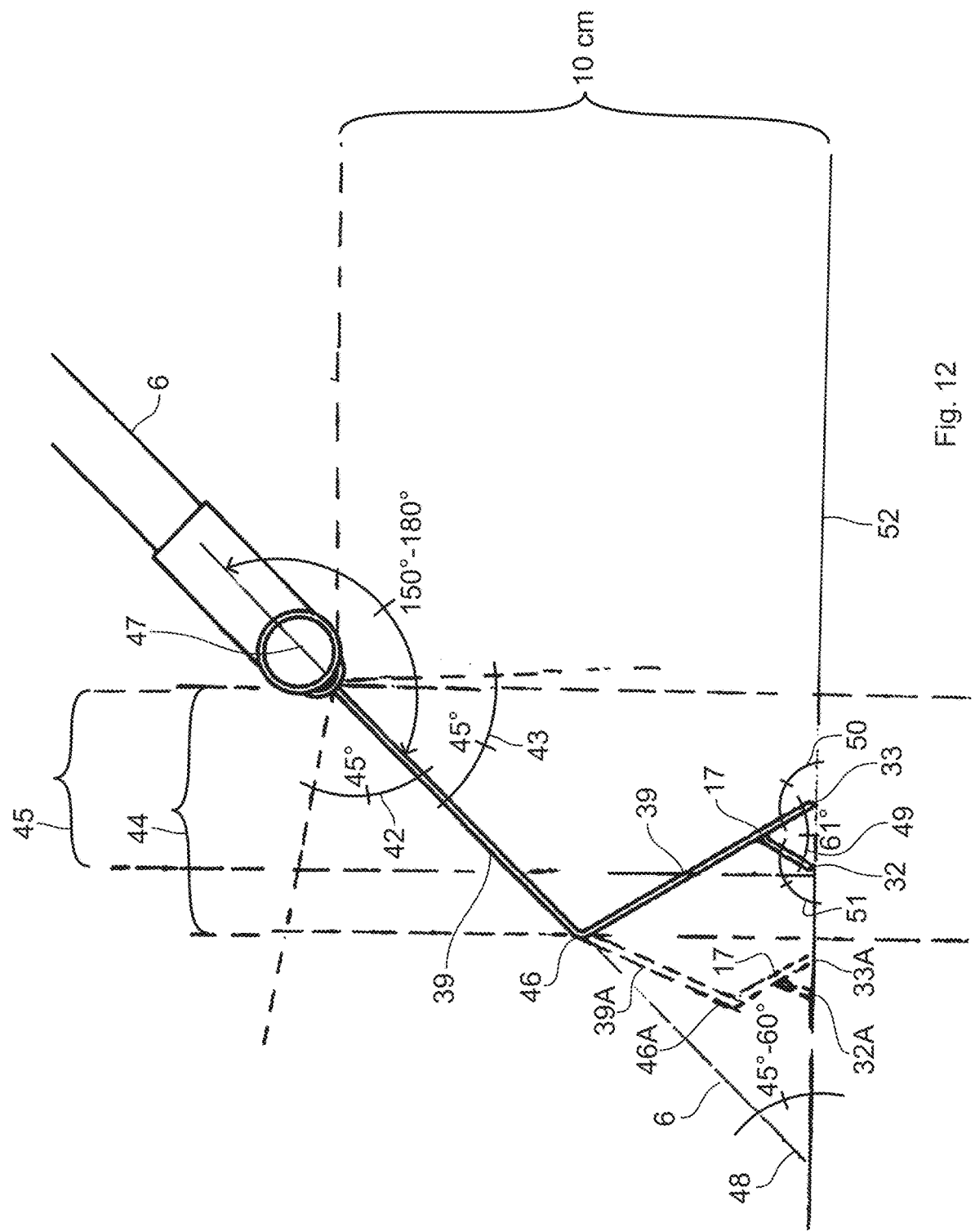
FIG. 12 shows a schematic illustration of the angles between the rake and the handle and between the tine and the ends.

FIG. 12 shows a schematic illustration of the relations between the rake handle (6), the tine (39), and the ground (52), in which, when the rake handle's (6) working position, there is at an approximately 45-60 degree (48) angle to the ground (52), the beginning part of the tine (39) is approximately at a 150-180 degree angle to the handle (6). The tine stem (39) curves toward the ground (52) through one (46) or two curves (46A), and the tine (39) ends are double ends (17), and the tines' (32, 33, 32A, 33A) angles (50, 51) to the ground (52) opening to the working direction are over the 90 degrees. There is a solution shown with the dash lines, in which the tine (39A) makes two curves (46, 46A) before the ground (52). The illustration shows that the distance (44) from the tine's (39) curve (46) to the tine's (39) flexible part (47) is greater than the distance (45) from the tine (39) ends (32, 33) to the flexible part (47).

The clarification and the related drawings are only intended for illustrating the concept according to the invention. The details of the rake according to the invention can vary within the framework of the following claims.

The invention claimed is:

1. A rake comprising:
a handle;
a rake head associated with the handle; and
a plurality of stiff tines extending from the rake head, with which, when the rake head stays in a working position, the rake is configured for a user to rake both with pulling and pushing motions,
wherein each tine of the plurality of stiff tines comprises a flexible part, wherein each flexible part attaches a corresponding stiff tine to the rake head, wherein the flexible part is made of a thinner material layer than the corresponding stiff tine,
wherein each stiff tine is independently flexible relative to the rake head at the flexible part, and wherein the flexible part's flexibility is such that the pressure on the tines from pushing and pulling of the rake bends the tines at the flexible point at a minimum of a 45 degree angle forwards and backwards from a resting position of the stiff tines, wherein the bending caused by pushing and pulling is configured to collect a load or loose objects, and
wherein the stiff tines comprise first and second tine ends extending in opposite directions away from a respective stem of the tines to define double-ended tips, wherein the first and second tine ends are arranged one after another in a principal raking direction, and wherein, when in a resting position, the first and second tine ends each form greater than 90-degree angles relative to the ground, and wherein, when the rake is in a working position, the rake handle is at a 45-60 degree angle to the ground.

2. The rake according to claim 1, wherein the double ended tips are detachable from a remainder of the tines.

3. The rake according to claim 1, wherein the entire rake is integral and formed from the same polymer material.

4. The rake according to claim 1, wherein, at the horizontal level, the tine ends are placed closer to the flexible part than to the tine point farthest off from the flexible part, so that when the rake is being pushed, the tines' farthest off point pulls the pulling tine behind it, and, in order to prevent the tine from bending under the rake head when being pushed in too sharp an angle, a tine's beginning part forms an approximately 180-150 degree angle to the rake handle, and a beginning part of those tines is at least 6-12 cm before they bend downwards toward the ground, which takes place through one or more curves, and the tine ends as a double end, and the angles to the ground of the tine ends, that are in the resting position, open into the working direction are over 90 degrees when, in the working position, the rake handle is at a circa 45-60 degree angle to the ground, and a distance between the tines' lowest and highest point is at least 10 cm.

5. The rake according to claim 1, wherein the rake head is relatively stiff compared to the flexible part.

6. The rake according to claim 1, wherein the bending is a bend of 11-19 degrees from a starting position of the stiff tine.

7. The rake according to claim 1, wherein the flexible part forms a U-shape in the tine.

8. A rake comprising:
a handle;
a rake head associated with the handle; and
a plurality of tines, wherein each tine of the plurality of tines extends individually from the rake head; wherein each tine has a flexible part which causes the tine to be independently flexible relative to the rake head; and wherein a respective first tine end and a respective second tine end extend in opposite directions away from each other and thereby form a respective double-ended tip of each tine, wherein the first tine end and the second tine end are arranged one after another in a principal raking direction;
wherein the rake is configured such that when the rake head is held at a fixed orientation relative to the ground and pulled, the flexible part of each tine flexes in a first direction which positions the first tines properly for raking; and
when the rake head is held in the fixed orientation and pushed, the flexible part of each tine flexes in a second direction that is opposite the first direction and which positions the second tines properly for raking, and
wherein each tine comprises: a respective stiff part; and the flexible part that connects the stiff part to the rake head and permits independent flex of each stiff part, wherein the flexible part is made of a thinner material layer than the corresponding stiff tine.

9. The rake according to claim 8, wherein each relatively stiff part comprises an inflection point and the rake is configured to position the inflection point ahead of a respective second tine end when the rake is being pushed, which is effective to cause the second tine end to be pulled by the relatively stiff part.

10. The rake according to claim 8, wherein when the rake handle is at a 45-60 degree angle to the ground and the rake is in a neutral position between being pulled and being pushed, the first tine end and the second tine end form a downward-facing concave shape, the first tine end and second tine end form an acute angle therebetween and the first tine end and second tine each form a respective angle relative to the ground that is greater than 90-degrees.

* * * * *